United States Patent
Ghazi et al.

(10) Patent No.: US 10,929,794 B2
(45) Date of Patent: Feb. 23, 2021

(54) DISPENSING SYSTEM

(71) Applicant: Kimberly-Clark Worldwide, Inc., Neenah, WI (US)

(72) Inventors: Babak R. Ghazi, Smyrna, GA (US); Frederick J. Williams, Jr., Cumming, GA (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 15/775,747

(22) PCT Filed: Apr. 29, 2016

(86) PCT No.: PCT/US2016/029998
§ 371 (c)(1),
(2) Date: May 11, 2018

(87) PCT Pub. No.: WO2017/188973
PCT Pub. Date: Nov. 2, 2017

(65) Prior Publication Data
US 2018/0368627 A1 Dec. 27, 2018

(51) Int. Cl.
G06Q 10/06 (2012.01)
A47K 5/12 (2006.01)
G06Q 10/00 (2012.01)
A47K 10/34 (2006.01)
A47K 10/32 (2006.01)
G06Q 10/08 (2012.01)

(52) U.S. Cl.
CPC ..... G06Q 10/06315 (2013.01); A47K 5/1217 (2013.01); A47K 10/34 (2013.01); G06Q 10/20 (2013.01); A47K 2010/3226 (2013.01); G06Q 10/087 (2013.01)

(58) Field of Classification Search
CPC ............. A47K 10/34; A47K 5/1217; A47K 2010/3226; G06Q 10/06315; G06Q 10/20; G06Q 10/087
USPC .............. 705/7.25; 242/550, 563; 222/52
See application file for complete search history.

(56) References Cited

U.S. PATENT DOCUMENTS

| | | | |
|---|---|---|---|
| 5,031,258 A | 7/1991 | Shaw | |
| 9,067,754 B2 | 6/2015 | Petersen | |
| 2005/0171634 A1* | 8/2005 | York | A47K 5/06 700/231 |
| 2009/0095821 A1* | 4/2009 | Feriani | B06B 1/0238 239/74 |
| 2009/0204256 A1* | 8/2009 | Wegelin | B05B 11/30 700/244 |
| 2011/0215188 A1 | 9/2011 | Lalau | |
| 2017/0173203 A1* | 6/2017 | Becker | A61L 9/14 |

FOREIGN PATENT DOCUMENTS

| | | |
|---|---|---|
| CN | 101068494 A | 11/2007 |
| CN | 104203058 A | 12/2014 |
| WO | 9933008 A2 | 7/1999 |

OTHER PUBLICATIONS

Creative Gadgets That Don't Even Require a Touch, Instablogs (2014) (Year: 2014).*

* cited by examiner

*Primary Examiner* — Charles Guiliano
(74) *Attorney, Agent, or Firm* — Craig M. Bohlken

(57) ABSTRACT

Methods, systems and apparatus for determining and coordinating dispenser product depletion dates.

16 Claims, 2 Drawing Sheets

DISPENSING SYSTEM

BACKGROUND

This disclosure relates to coordinating product dispensers' dispensing activities for efficient servicing and maintenance.

Systems dispensing consumable products are ubiquitous in many environments today. For example, hand towel dispensers are commonplace in many semi-private and public washrooms and break rooms. Monitoring and refilling such dispensers can be a time consuming and laborious endeavor requiring, in some scenarios, that an attendant or building maintenance team member routinely check the dispensers and refill as needed. This process inevitably results in checking the dispenser and determining that no refill is required, resulting in an unnecessary visit to the dispenser, which leads to building management inefficiencies and additional costs.

This process, including such unnecessary visits, is magnified given that many environments include multiple dispensers, for example, one washroom may include numerous hand towel, bath tissue and hand soap dispensers, and that there can be dozens of washrooms in a commercial building spread across many different floors.

SUMMARY

In general, the subject matter of this specification relates to coordinating product dispensers dispensing activities for efficient servicing and maintenance.

In general, one aspect of the subject matter described in this specification can be implemented in systems that include a system comprising a plurality of dispensers, each configured to dispense one of soap, paper towels or air freshener and each is configured to report product usage information; and a processing system configured to: receive the product usage information from each of the plurality of dispensers, determine expected product depletion dates for each of the plurality of dispensers based on the respective product usage information, determine respective revised dispensing profiles for one or more of the plurality of dispensers that specify revised settings to respective initial dispensing profiles to cause the respective expected product depletion dates to be within a threshold range of one another, and communicate the respective revised dispensing profiles to the one or more of the plurality of dispensers. Other embodiments of this aspect include corresponding methods, apparatus, and computer program products.

Yet another aspect of the subject matter described in this specification can be implemented in methods that include receiving product usage information from each of a plurality of dispensers; determining expected product depletion dates for each of the plurality of dispensers based on the respective product usage information; determining respective revised dispensing profiles for one or more of the plurality of dispensers that specify revised settings to respective initial dispensing profiles to cause the respective expected product depletion dates to be within a threshold range of one another; and communicating the respective revised dispensing profiles to the one or more of the plurality of dispensers. Other embodiments of this aspect include corresponding systems, apparatus, and computer program products.

In some implementations, the methods, systems, apparatus, and computer program products described herein have the following features, including where the dispensers are configured to receive the respective revised dispensing profiles and dispense according to the respective revised dispensing profiles. The revised dispensing profiles specify respective amounts of products to be dispensed by the dispensers.

The revised dispensing profile for a paper towel dispenser specifies a length of a paper towel to be dispensed and the revised dispensing profile for a soap dispenser specifies a shot quantity to be dispensed. Determining expected product depletion dates for each of the dispensers comprises, for each of the dispensers, determining a usage profile that specifies forecasted product usage over a future time period.

Determining respective revised dispensing profiles includes identifying maintenance dispenser service schedules specifying a next service visit for one or more of the plurality of dispensers; and adjusting the respective revised dispensing profiles to cause the expected product depletion dates to not predate a date of the next service visit.

The processing system communicates to the dispensers through a wireless communication network and the wireless communication network includes a hub configured for bidirectional communication with each of the plurality of dispensers and the processing system. The hub comprises and audio speaker configured to deliver audio content to patrons in the vicinity of one or more dispensers. The dispensers comprise at least one of a soap dispenser, a paper towel dispenser or an air freshener dispenser.

Particular embodiments of the subject matter described in this specification can be implemented so as to realize one or more of the following advantages. For example, washroom service personnel often have service routes that allow them to service washrooms in a particular vicinity (e.g., on the same floor or building or group of buildings) on a given day or during a given time slot. Product (e.g., hand towels or hand soap) from all dispensers are not generally consumed at the same rate (e.g., dispensers in busy washrooms will be depleted sooner or at a faster rate than similar dispensers in less busy washrooms). Thus it often happens that some dispensers need to be refilled during the regularly scheduled service visits as they are empty or near empty while other dispensers, which may have significant product remaining, don't need to be refilled at that time.

However, the dispensers that are not refilled may deplete before the next scheduled service visit requiring an unscheduled visit to refill, which leads to additional service costs for the unscheduled visits. If the service personnel choose to refill those dispensers with product remaining during the scheduled visits (e.g., to avoid or minimize the unscheduled visits) then the product remaining in the dispenser being refilled (e.g., a hand towel roll or soap dispenser bottle) is typically discarded even though it has useful product remaining. This leads to waste and increased operating costs.

The technology described herein coordinates the dispensing activities among a set of dispensers (e.g., all of those dispensers serviced in a typical service visit) so that they deplete at approximately the same time or within a threshold time range (e.g., within 12 hours or the same day) and/or do not deplete before a given day/time. This can be accomplished by predicting the amount of product to be used in each dispenser over time and managing or varying, for example, the amount of product dispensed over such time period to ensure the dispensers all deplete (or are within some near depletion condition) within some defined time range. This allows all dispensers to be serviced during the same visit without having to refill dispensers with significant product remaining (and wastefully discarding that product) and avoids making unnecessary unscheduled service visits.

Managing the amount of product dispensed includes, for example, changing the amount of product dispensed on a per dispense basis. This improves the operational efficiencies of the service attendants and reduces costs (e.g., by reducing unscheduled service visits and not discarding useful product during the refill process).

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
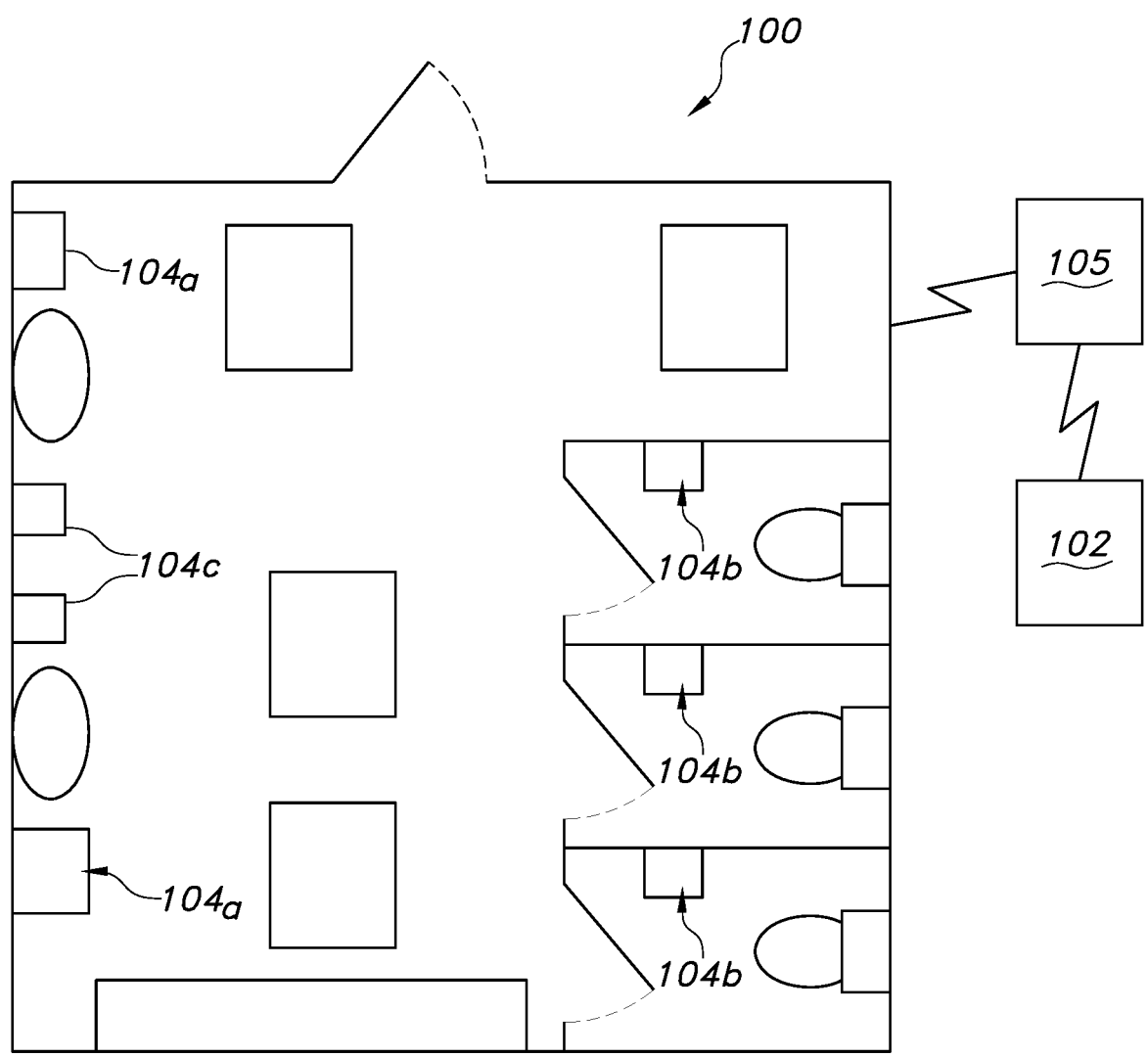
FIG. 1 is a block diagram of an example environment in which a dispensing system can be implemented.

The present disclosure generally relates to coordinating product dispensers' dispensing activities for efficient servicing and maintenance. In some implementations, the dispensing system receives product usage reports from the dispensers (e.g., in a washroom, building floor or entire building) indicating how many dispensing events have occurred (e.g., how many times the dispenser has dispensed since the last report or refill), how much product the dispensers have dispensed (e.g., how many inches or feet of towel or tissue or fluid oz. of hand soap) and/or how much product remains. The dispensers can send the reports periodically (e.g., hourly or daily), upon the system's request and/or upon a low product condition (e.g., only 10% of the product remains). The reports can include time stamps indicating the date and time of each dispense.

Based on the product usage reports, for each dispenser, the dispensing system can forecast/predict when the dispenser will be depleted of product or reach a threshold depletion state (e.g., only 10% of product remains). These predicted or expected depletion date determinations can occur in response to receiving each report or can occur accordingly to a predetermined schedule. Regardless, the dispensing system then determines revised dispensing profiles (e.g., dispensing settings) for the dispensers.

These revised profiles specify adjustments or revisions to the initial dispensing profiles that cause the expected product depletion dates for all or a set of dispensers to be within a threshold time range of one another (e.g., a specified number of hours). For example, the adjustments for a first hand towel dispenser that is frequently used and has less product remaining than a second hand towel dispenser at a given time in the same washroom (and thus would be expected to run out of paper before the second dispenser) could specify that less paper is to be dispensed for each use as compared with its initial settings. For example, for the first dispenser, the initial settings could have set 8 inches of paper to be dispensed for each use and the revised settings could dictate that only 6 inches of paper be dispensed for each use.

In this way, on a per dispense basis, the product in the first dispenser can be made to last longer regarding its expected depletion date to coordinate with (e.g., match or be within some time range of) the expected depletion date of the less frequently used second dispenser such that both delete within a given time frame. And such that the first and second dispensers can be serviced (e.g., refilled) during the same service visit without having to throw away unused amounts of product that are in the less frequently used dispenser.

Thus, based on the product usage reports, the dispensing system coordinates expected depletion dates for the dispensers to occur in a given time frame by, for example, changing the dispensing settings on one of more of the dispensers to allow efficient service during the same visit. The operation of such a dispensing system is described in more detail below with reference to FIG. 1.

FIG. 1 is a block diagram of an example environment 100 in which a dispensing system can be implemented. In some implementations, the dispensing system includes one or more dispensers 104 and a data processing system 102. The environment 100 can include, for example, a semi-private or public washroom or break room or another space in which the dispensers 104 are located. The dispensers 104 can include, for example, hand towel dispensers 104*a*, bath tissue dispensers 104*b*, hand soap (or other cleansing) dispensers 104*c*, hand or facial care dispensers (not pictured), surface cleaning, sanitizing or disinfecting dispensers (not pictured) including for toilets or urinals, and/or the like. In some implementations, the dispensing system can also include a hub 105 to facilitate communications between the data processing system 102 and the dispensers 104, as described below in more detail.

Figure 2:
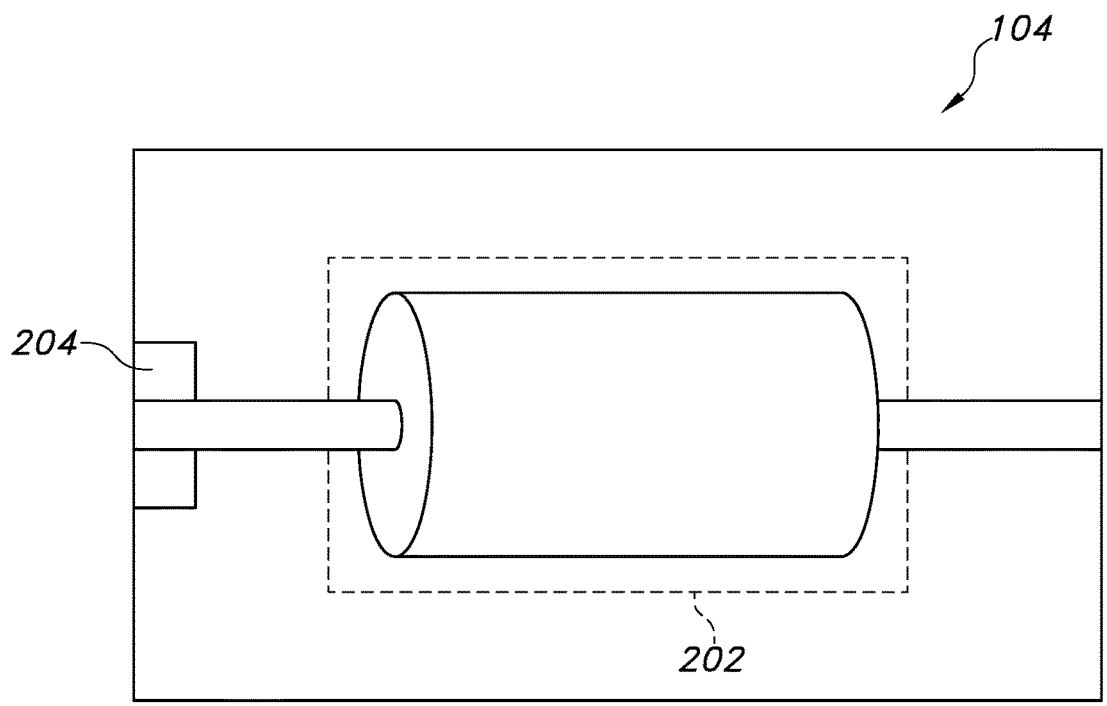
FIG. 2 is a representation of an example dispenser.

FIG. 2 is a representation of an example dispenser 104. A dispenser 104 can be, for example, a hand towel dispenser 104*a*, bath tissue dispenser 104*b*, a hand soap dispenser 104*c*, a hand or facial care dispenser (e.g., a moisturizer dispenser), air freshener or odor sterilization device (not pictured), to name a few. In some implementations, the dispenser 104 includes a consumable product storage area 202 and a dispensing mechanism 204 operatively coupled to the product storage area 202 to dispense the product to facilitate dispensing. The consumable product storage area 202 is an area (e.g., cavity or opening) in which the product to-be-dispensed (e.g., consumable product) by the dispenser 104 is located and/or stored for use. The consumable product storage area 202 can be completely or only partially enclosed within the dispenser 104. The dispensing mechanism 204 is a mechanism that facilitates dispensing of the consumable product for use by a user.

In some implementations, the dispensing mechanism 204 is a device that allows a user to manually dispense the consumable product, e.g., by pulling on a portion of the consumable product or turning a twist dial or knob or pushing a pump to cause a dispense operation/actuation. In some implementations, the dispensing mechanism 204 is an automated (e.g., electro-mechanical) device that advances or otherwise dispenses or aids in the dispensing of the consumable product. For example, in response to a slight tug on a paper towel partially exposed from beneath the dispenser 104 or in response to detecting motion proximate the dispensing device 104 (e.g., through an infrared motion sensor), the dispensing mechanism 204 actuates to automatically advance or otherwise dispense the consumable product to the user. In the case of a hand soap dispenser 104*c*, for example, the dispensing mechanism 204 may be a manual or power operated pump-type device.

As described above, the dispensing system includes a data processing system 102. The data processing system 102 can communicate with the dispenser 104 across wireless or wired channels, or some combination thereof. For example, the data processing system 102 includes a transceiver and microprocessor to facilitate such communications. In some implementations, the data processing system 102 is connected to a WAN or LAN to communicate to and with the dispensers 104 and other devices such as mobile devices and/or servers.

In some implementations, the data processing system 102 receives product usage information from the dispensers 104, e.g., the number of dispenses since the last refill for or report from a dispenser 104, and can determine product usage states from such information. For example, if the number of dispenses is 430 and the maximum number of dispenses of the product until depletion is 500 then the data processing system 102 determines that the remaining number of dispenses is 70 (i.e., 500—430). In some implementations, the dispensers 104 additionally or alternatively send the data processing system 102 reports specifying the amount of product used (e.g., 1004 feet of rolled towel, 17 ounces of hand soap) and/or the amount of product remaining.

The dispensers 104 can send the reports periodically (e.g., hourly or daily), upon the data processing system's request and/or upon a low product condition (e.g., only 10% of the product remains). The reports can include time stamps indicating the date and time of each dispense.

In some implementations, the dispenser 104 permits a service attendant, facility manager or the data processing system 102 to locally or remotely select how much product is dispensed by an actuation/dispense cycle. In this case, the report of the number of dispenses would include the number of dispenses at each length or amount. For example, if there are multiple dispensing lengths then the report would indicate that 300 dispenses of 8 inches occurred and 130 dispenses of 6 inches occurred or 430 dispenses or 8 inches occurred, and also indicate the current dispense length setting (e.g., 6 or 8 inches). With the programmatically set capacity/initial amount of each consumable (e.g., towels, tissue or soap) in the dispensers 104, the data processing system 102 can determine how much of the product has been used and how much remains. For example, if a hand towel roll has 4000 inches of product and there were 430 reported dispenses of 8 inches then the data processing system 102 determines that 70 ((4000−3440)/8) dispenses are available.

The data processing system 102 can determine the expected product depletion date(s) of product in the dispensers 104 based on the product usage data, dispensing capacity, and/or dispensing profiles.

In some implementations, the data processing system 102 stores the number of dispenses available for each dispenser 104 for each product (e.g., dispensing capacity) compatible with that dispenser to facilitate determining the expected product depletion date. Table 1 shows example dispensing capacities:

TABLE 1

|  | Product 1 | Product 2 | Product 3 |
| --- | --- | --- | --- |
| Dispensing Device A | 200 Dispenses | 570 Dispenses |  |
| Dispensing Device B | 200 Dispenses |  |  |
| Dispensing Device C |  |  | 250 Dispenses |

Table 1 shows that Product 1 (e.g., a small hand towel roll) is compatible with Dispensing Devices A and B and, for each, the dispensing capacity (e.g., the number of dispenses from full until the product is depleted) is 200 dispenses. Product 2 (e.g., a larger hand towel roll) is only compatible with Dispensing Device B and the dispensing capacity is 570 dispenses. Lastly, Product 3 (e.g., a liquid hand cleaner container) is only compatible with Dispensing Device C and the dispensing capacity is 250 dispenses.

The dispensing capacity, by way of example for a hand towel roll, can be determined based on the starting length of the hand towel roll and the length of roll dispensed during each dispensing process. For example, for a hand towel roll with a starting length of 475 feet and a dispense length of ten inches during each dispense, the number of dispenses to completely exhaust the roll is 570 ((475 feet*12 inches/per foot)/10 inches).

In some implementations, the data processing system 102 is programmed with an initial dispensing profile, for each dispenser 104, which defines, for example, the estimated time rate of use of product in the dispenser 104, the amount of product dispensed per dispense, and/or some combination thereof. Alternatively or additionally, the data processing system 102 can generate a usage profile for each dispenser 104 that specifies forecasted product usage over a future time period based on historical use using, for example, predictive modeling techniques such as neural networks, vector machines, k-nearest neighbor, regression, least squares, or Naïve Bayes algorithms, or the like. This usage profile can then be used as the initial dispensing profile.

The initial dispensing profile, for example, may specify a linear-type use or average use profile such as forty dispenses per day or eight dispensers per hour at a specified product dispense amount. Or the profile may specify a time-varying use profile, for example, as shown in Table 2 below:

TABLE 2

| Daily Period | Estimated number of dispenses for Dispenser XYZ | Dispense Amount |
| --- | --- | --- |
| 12:01am-3am | 7 | 5 units (e.g., inches or oz.) |
| 3:01am-6am | 12 | 5 units |
| 6:01am-9am | 17 | 5 units |
| 9:01am-noon | 14 | 5 units |
| 12:01pm-3pm | 22 | 5 units |
| 3:01pm-6pm | 25 | 5 units |
| 6:01pm-9pm | 13 | 5 units |
| 9:01pm-12am | 8 | 5 units |

In some implementations, the dispensing profile can vary not only across a day (as shown in Table 2) but also across days of the week, weeks of the month, holidays, special events (e.g., a sporting event or musical concert), or some combination thereof. For example, Table 2 reflects a dispensing profile for Mondays at a first dispense amount of 5 units. The dispensing profile for Tuesdays may be different such as that shown on Table 3, including a reduced dispense amount as this dispenser 104 may be on a path to deplete before other dispensers on its service route and the amount is reduced to push back its expected product depletion date to match or better align with those of the other dispensers:

TABLE 3

| Tuesday | Estimated number of dispenses for Dispenser XYZ | Dispense Amount |
| --- | --- | --- |
| 12:01am-3am | 4 | 4 units |
| 3:01am-6am | 15 | 4 units |
| 6:01am-9am | 30 | 3 units |
| 9:01am-noon | 6 | 3 units |
| 12:01pm-3pm | 17 | 3 units |
| 3:01pm-6pm | 22 | 4 units |
| 6:01pm-9pm | 9 | 3 units |
| 9:01pm-12am | 3 | 4 units |

In some implementations, as described above, the data processing system 102 determines an expected product depletion date. For example, using the initial dispensing profile specified in Table 2 and 570 available dispenses for the dispenser 104, the data processing system 102 determines:

- 118 dispenses will occur on Monday (starting at 12:01 am) leaving 452 dispenses available (570−118)
- 118 dispenses will occur on Tuesday leaving 334 dispenses available (452−118)
- 118 dispenses will occur on Wednesday leaving 216 dispenses available (334−118)
- 118 dispenses will occur on Thursday leaving 98 dispenses available (216−118)
- 98 dispenses will occur on Friday and the dispenser will run out/be fully depleted during the 6:01 pm-9 pm time period (as only 1 dispense will remain during this period and 13 dispenses are expected).

Thus the data processing system 102 determines that the expected depletion date/time is Friday, 6:01 pm-9 pm. The data processing system 102 can communicate this information to a maintenance dashboard or otherwise alert maintenance personnel to this end.

In some implementations, the data processing system 102 dynamically adjusts the expected depletion date(s) over time as it receives reports from the dispenser(s) 104 concerning the number of dispenses that have actually occurred. For example, if at 11:59 pm on Monday, the data processing system 102 receives a report that 120 dispenses actually occurred, as opposed to the 118 expected, then the data processing system 102 would determine that only 450 dispenses are available starting on Tuesday and continue using the estimate profile such that the 332 (450−118) dispenses are expected to be available starting on Wednesday. If, however, at 11:59 pm on Tuesday, the data processing system 102 receives a report that 130 dispenses actually occurred, as opposed to the 118 expected, then the data processing system 102 would determine that only 320 dispenses are available starting on Wednesday, as opposed to the 332 expected. The sequence continues to iterate as updated dispense activity is reported to the data processing system 102. As described above, the data processing system 102 determines expected product depletion dates for more than one of the dispensers 104.

The data processing system 102 determines revised dispensing profiles for one or more of the dispensers 104 that specify revised settings to the initial dispensing profiles to cause the expected product depletion dates for the various dispensers 104 to be within a threshold range of one another. For example, Table 4 shows initial dispenser profiles for Dispensers A, B and C indicating the number of dispenses expected per day, where each of Dispensers A, B and C have a dispensing capacity of 20 with a 5 unit dispensing amount (e.g., 5 inches of sheet towel dispensed per dispense), thus having a 100 unit capacity (i.e., 5*20=100).

TABLE 4

|  | Mon. | Tues. | Wed. | Thurs. | Fri. | Sat. | Sun. |
| --- | --- | --- | --- | --- | --- | --- | --- |
| Dispenser A | 3 | 3 | 3 | 3 | 3 | 3 | 2 |
| Dispenser B | 4 | 4 | 4 | 4 | 4 | 3 | 2 |
| Dispenser C | 5 | 4 | 3 | 3 | 3 | 2 | 12 |

Table 4 indicates that Dispenser A will deplete its product on Sunday (its expected depletion date), as it will have dispensed all 20 dispenses by Sunday, that Dispenser B will deplete its product on Friday, and that Dispenser C will deplete its product by Saturday. Thus Dispensers A, B and C, respectively, have expected depletion dates on Sunday, Friday and Saturday. A service visit may be scheduled for Sunday so it would be most efficient to service all dispensers on that day and that no dispenser runs out of product prior to that day, which may result in dissatisfied users.

To align the expected depletion dates, the data processing system 102 can, for example, change the dispensing amount. For example, the data processing system 102 changes the dispensing amount for Dispenser B to 4 units. Given that Dispenser B is expected to have 25 dispenses through Sunday and the revised setting of 4 units per dispense results in 100 units dispensed through Sunday, which is the capacity for Dispenser B.

Further, the data processing system 102 changes the dispensing amount for Dispenser C to 3.125 units given that Dispenser C is expected to have 32 dispenses through Sunday and the revised setting of 3.125 units per dispense results in 100 units dispensed through Sunday, which is also the capacity for Dispenser C. Thus by changing the settings, the data processing system 102 coordinates the dispensers 104 to be depleted in a similar time frame (e.g., the same day) or, more generally, within a threshold range of one another. The data processing system 102 then communicates these revised settings to the respective dispenser 104 to change its dispensing amount. More generally, the dispensers 104 receive the respective revised dispensing profiles and dispense according to the respective revised dispensing profiles. These revised profiles may be temporary or semi-permanent (e.g., to be used by the dispensers 104 until the next service visit, after which the dispensers revert to the initial profiles, or for a longer duration).

In some implementations, the data processing system 102 identifies or is provided (e.g., programmatically by an administrator) a maintenance dispenser service schedule specifying a next service visit for the dispensers 104, and adjusts the revised dispensing profiles to cause the expected product depletion dates for the dispensers 104 to not predate a date of the next service visit (e.g., for the expected depletion dates to occur on the day after or the day of the service visit). In this way the data processing system 102 prevents a dispenser 104 from running out of product before the next service visit. Regarding the example based on Table 4, the next service visit was Sunday so the dispensing profiles for Dispensers B and C were revised to ensure they did not run out of product before that service date.

In some implementations, the data processing system 102 communicates with the dispensers 104 through a hub 105 (e.g., a bidirectional communication device that is part of the communication channel between the dispensers and 104 and data communication system 102 such as a wireless router). Further, in some implementations, the hub 105 includes an audio speaker that delivers audio content to patrons in the vicinity of the dispensers 104. The audio content can be delivered and managed by the data processing system 102.

Figure 3:
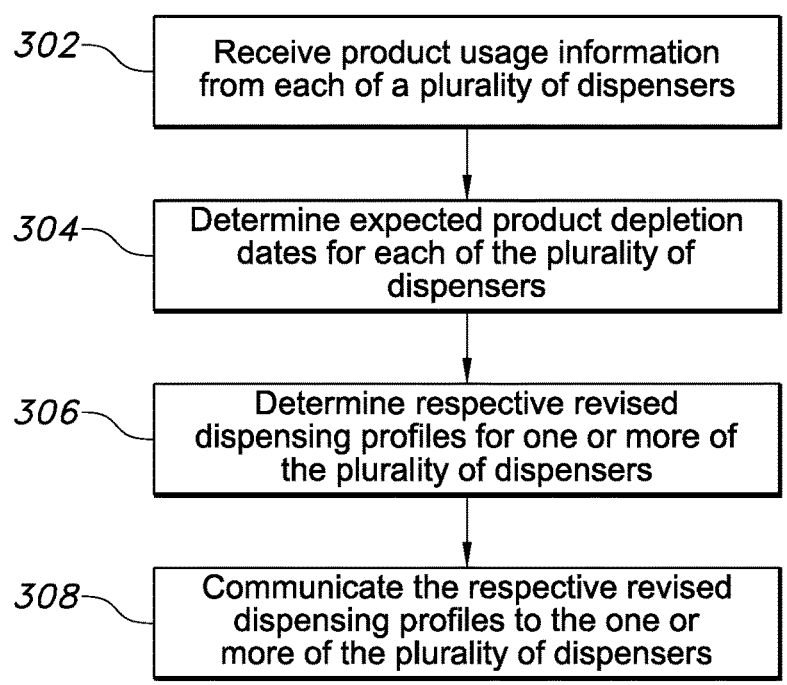
FIG. 3 is a flow chart of an example process for managing dispensers.

FIG. 3 is a flow chart of an example process for managing dispensers 104. The dispensing system can, for example, perform the steps described with reference to FIG. 3.

Product usage information from each of a plurality of dispensers is received (302). For example, the data processing system 102 receives product usage information from the dispensers 104 such as the amount of product remaining, used and/or number of dispenses since a refill event or last report.

Expected product depletion dates for each of the plurality of dispensers based on the respective product usage information are determined (304). For example, the data processing system 102 determines the expected product depletion dates for the dispensers 104 based on dispensing profiles and dispensing capacity, as described above.

Respective revised dispensing profiles are determined for one or more of the plurality of dispensers that specify revised settings to respective initial dispensing profiles to cause the respective expected product depletion dates to be within a threshold range of one another (306). For example, the data processing system 102 determines the revised dispensing profiles.

The respective revised dispensing profiles are communicated to the one or more of the plurality of dispensers (308). For example, the data processing system 102 communicates the revised profiles to the dispensers 104. In some implementations, the communications between the dispensers 104 and system 102 are passed through a hub 105 for handling.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus or data processing system encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A dispensing system comprising:
   a plurality of different dispensers, at least one of the plurality of different dispensers configured to dispense paper towels and at least at least one of the plurality of different dispensers configured to dispense bath tissue and each is configured to report product usage information; and
   a data processing system configured to:
   receive the product usage information from each of the plurality of different dispensers, wherein the product usage information for each of the plurality of different dispensers has different use profiles specifying, respectively, the frequency with which each of the plurality of different dispensers dispense,
   determine expected product depletion dates for each of the plurality of different dispensers based on the respective product usage information,
   determine respective revised dispensing profiles for each of the plurality of different dispensers that specify revised settings to respective initial dispensing profiles to cause the respective expected product depletion dates to match one another,
   communicate the respective revised dispensing profiles to the plurality of different dispensers;
   wherein:
   the processing system communicates to the plurality of different dispensers through a wireless communication network, the wireless communication network includes a hub configured for bidirectional communication with each of the plurality of different dispensers and the processing system, and the hub comprises an audio speaker configured to deliver audio content to patrons in the vicinity of one or more of the plurality of different dispensers; and
   the plurality of different dispensers operate according to the respective revised dispensing profiles to match depletion dates to coordinate product depletion in each of the plurality of different dispensers to deplete on a same day.

2. The dispensing system of claim 1, wherein the one or more of the plurality of different dispensers are configured to receive the respective revised dispensing profiles and dispense according to the respective revised dispensing profiles.

3. The dispensing system of claim 1, wherein the revised dispensing profiles specify respective amounts of products to be dispensed by the one or more of the plurality of different dispensers.

4. The dispensing system of claim 3, wherein a respective revised dispensing profile for a paper towel dispenser specifies a length of a paper towel to be dispensed.

5. The dispensing system of claim 3, wherein a respective revised dispensing profile for a soap dispenser specifies a shot quantity to be dispensed.

6. The dispensing system of claim 1, wherein determine expected product depletion dates for each of the plurality of different dispensers comprises, for each of the plurality of different dispensers, determine a usage profile that specifies forecasted product usage over a future time period.

7. A dispensing system comprising:
   a plurality of different dispensers, at least one of the plurality of different dispensers configured to dispense paper towels and at least at least one of the plurality of different dispensers configured to dispense bath tissue and each is configured to report product usage information; and
   a data processing system configured to:
   receive the product usage information from each of the plurality of different dispensers, wherein the product usage information for each of the plurality of different dispensers has different use profiles specifying, respectively, the frequency with which each of the plurality of different dispensers dispense,
   determine expected product depletion dates for each of the plurality of different dispensers based on the respective product usage information,
   determine respective revised dispensing profiles for the plurality of different dispensers that specify revised settings to respective initial dispensing profiles to cause the respective expected product depletion dates to match one another comprising:
   identify maintenance dispenser service schedules specifying a next service visit for one or more of the plurality of different dispensers; and adjust the respective revised dispensing profiles to cause the respective expected product depletion dates of each of the plurality of different dispensers to occur on a same day and not predate a date of the next service visit, and communicate the respective revised dispensing profiles to the one or more of the plurality of different dispensers.

8. A method comprising:

receiving product usage information from each of a plurality of different dispensers, at least one of the plurality of different dispensers configured to dispense paper towels and at least at least one of the plurality of different dispensers configured to dispense bath tissue, wherein each of the plurality of different dispensers has different use profiles specifying, respectively, the frequency with which each of the plurality of different dispensers dispense;

determining expected product depletion dates for each of the plurality of different dispensers based on the respective product usage information;

determining respective revised dispensing profiles for the plurality of different dispensers that specify revised settings to respective initial dispensing profiles comprising identifying maintenance dispenser service schedules specifying a next service visit for one or more of the plurality of different dispensers; and adjusting the respective revised dispensing profiles to cause the expected product depletion dates to not predate a date of the next service visit;

communicating the respective revised dispensing profiles to the plurality of different dispensers, and wherein the plurality of different dispensers operate according to the respective revised dispensing profiles to match depletion dates to coordinate product depletion in each of the plurality of different dispensers to deplete on a same day by changing an amount of product dispensed by one or more of the plurality of different dispensers and wherein at least one of the plurality of different dispensers, in response to detecting motion, by a motion sensor device, proximate the least one of the plurality of different dispensers, actuates to automatically dispense product.

9. The method of claim 8, wherein the plurality of different dispensers comprise at least one of a soap dispenser, a paper towel dispenser or an air freshener dispenser.

10. The method of claim 9, wherein a respective revised dispensing profile for the paper towel dispenser specifies a length of a paper towel to be dispensed.

11. The method of claim 9, wherein a respective revised dispensing profile for the soap dispenser specifies a shot quantity to be dispensed.

12. The method of claim 8 comprising receiving, by the plurality of different dispensers, the respective revised dispensing profiles and dispensing according to the respective revised dispensing profiles.

13. The method of claim 8, wherein the revised dispensing profiles specify respective amounts of products to be dispensed by the one or more of the plurality of different dispensers.

14. The method of claim 8, wherein determining expected product depletion dates comprises, for each of the plurality of different dispensers, determining a usage profile that specifies forecasted product usage over a future time period.

15. The method of claim 8 comprising communicating to the plurality of different dispensers through a wireless communication network.

16. The method of claim 8 comprising broadcasting audio messages, by a hub in the vicinity of one or more of the plurality of different dispensers, wherein the hub is configured for bidirectional communication with the plurality of different dispensers.

* * * * *